No. 885,183. PATENTED APR. 21, 1908.
H. B. SCHMIDT.
PROCESS FOR THE MANUFACTURE OF GRAY ACETATE OF LIME AND WOOD ALCOHOL.
APPLICATION FILED FEB. 12, 1902.
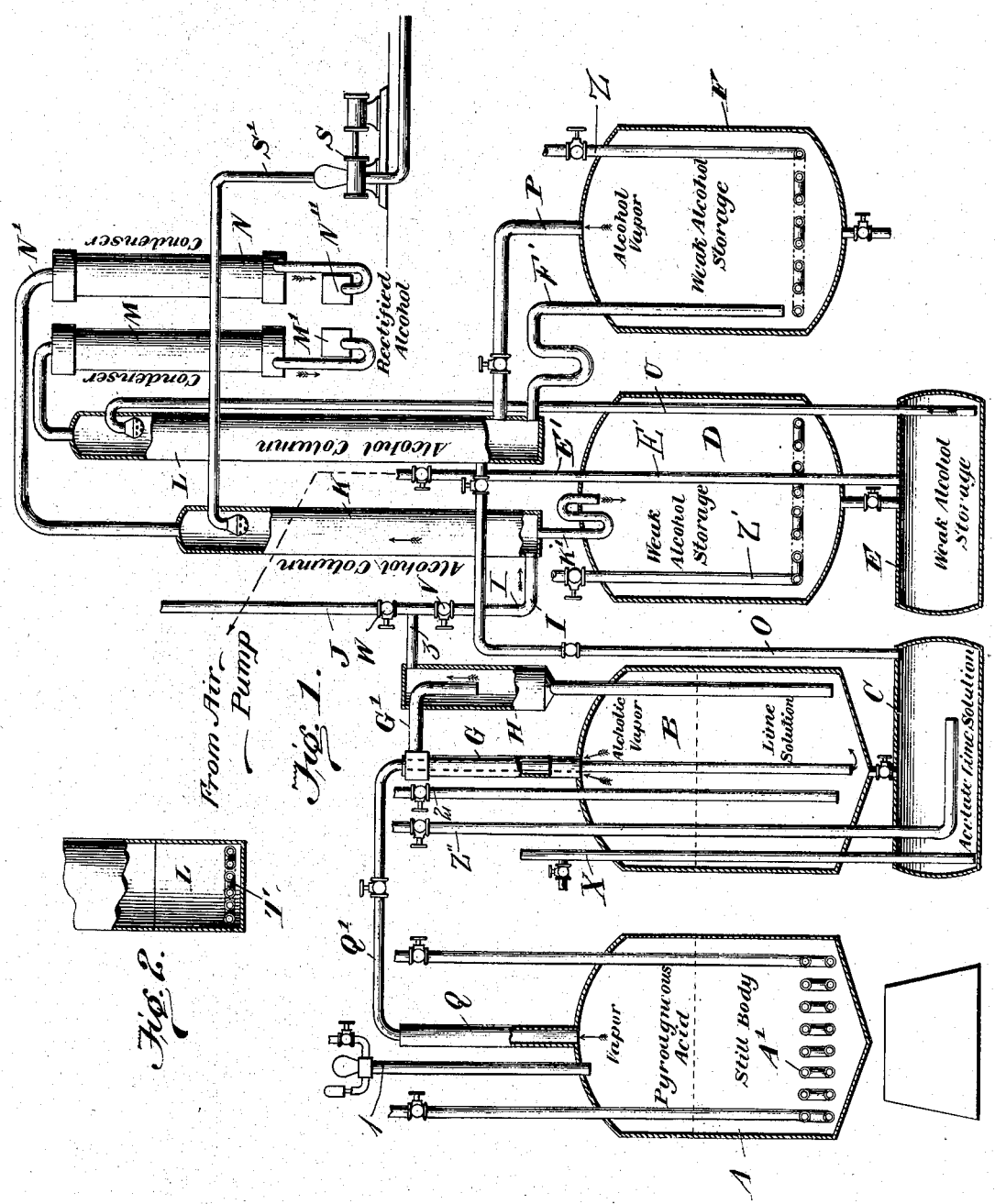
Witnesses
G. Howard Walmsley
Elmer Heavey
Inventor
Herman B. Schmidt,
By Frank C. Gore.
Attorney

UNITED STATES PATENT OFFICE.

HERMAN B. SCHMIDT, OF CINCINNATI, OHIO, ASSIGNOR TO JOSLIN, SCHMIDT & CO., OF CINCINNATI, OHIO, A FIRM.

PROCESS FOR THE MANUFACTURE OF GRAY ACETATE OF LIME AND WOOD-ALCOHOL.

No. 885,183.           Specification of Letters Patent.           Patented April 21, 1908.

Application filed February 12, 1902. Serial No. 93,699.

*To all whom it may concern:*

Be it known that I, HERMAN B. SCHMIDT, a citizen of the United States, residing at Cincinnati, county of Hamilton, State of Ohio, have invented certain new and useful Improvements in Processes for the Manufacture of Gray Acetate of Lime and Wood-Alcohol, of which the following is a specification.

This invention relates to processes for the manufacture of gray acetate of lime and wood alcohol.

The object of the invention is the provision of a process for the manufacture of gray acetate of lime and wood alcohol which will be economical in the use of labor and steam, and water for condensation purposes, and will insure the production of wood alcohol in any desired proof, in a rapid manner and combine in one process what has heretofore required distinct and independent processes to accomplish.

The process is set forth fully hereinafter and described in connection with a preferred form of apparatus to accomplish it.

The novel features of the process are set forth in the appended claims.

In the drawing: Figure 1 is a representation of a preferred form of apparatus for carrying out the process; Fig. 2 is a modified form of one of the alcohol columns.

A represents a still supplied with suitable steam heating coils A' into which the crude pyroligneous liquor containing 2% alcohol is pumped through pipe 1 and by means of the heating coils A' set to boiling. From this still the steam, acetic acid and alcoholic vapors rise through a column Q, thence passing through pipe Q' they are discharged into tank B. In the tank B, is placed a charge of quicklime, immersed in water or in weak acid liquors obtained from tar distillation. Weak acid liquors are employed, because the small amount of volatile acetic, etc., acids in the solution after neutralization with lime would not pay to evaporate by itself, as the cost of fuel would exceed the value of the acetate of lime recovered; therefore, these weak acid liquors are used instead of water to make a milk of lime, which on being saturated with the volatile acids in the still after evaporation, yields an increased amount of acetate of lime. The lime absorbs the acid vapors and the alcoholic vapors and steam rise through a column G, surrounding pipe Q' and pass via pipe G' into a separator H, where all matter mechanically carried over is deposited in the lime solution again. The vapors are then carried through pipe 3 into a pipe I having the valves V and W and an extension pipe J opening into the air and adapted to be used as an exhaust and then discharge into a column K. The rising vapors in column K are met by a descending column of weak alcoholic liquor (test from 1° to 5° alcoholic strength on the alcoholometer) supplied by a pump S and pipe S' sprayed into the upper portion of column K, and the non-condensed portion of the rising vapor is carried to a condenser N via pipe N' and passes from the condenser into a storage tank N'' of suitable form and dimensions. The condensed liquor from column K passes through a tail pipe K' into a tank D, from which it flows into a receiver E and is then forced by pressure from pipe E' received from any suitable source through a riser pipe U into the top of another column L and descending through the column L meets a column of alcoholic vapor from either a receiver C, located below tank B, or from a tank F, containing oil and water tailings the receiver C being in communication with column L by a pipe O and tank F by a pipe P leading into the lower portion of column L. The acetate of lime solution in C occasionally furnishes alcohol, for the reason that if the operatives are careless in not having an excess of lime present in B, then the methyl acetate vapors are not decomposed by the lime; then these can be boiled over from tank C; they will then go into the alcohol column L and be washed down into the weak alcohol storage tank F. After that the acetate of lime solution in C is discharged. Under such circumstances, the strength of the alcoholic vapors coming from F start off at 50° to 60° alcoholic strength on the alcoholic-meter and begin to drop immediately; gradually dropping until practically vapor of water is given off from it. If desired, a boiling pipe T may be placed in the bottom of column L as indicated in Fig. 2 to generate vapor from the liquor in the bottom of said column L. The vaporous alcohol is condensed in another condenser M and conducted to a suitable tank M', while the tailings pass from column L into tank F via a pipe F'' As a general rule the tank F contains only water and oils which can be discharged therefrom into a sewer, but as a precautionary measure against wasting alcohol, the liquor in tank F can be set to boiling by use of steam pipe Z and the distillate condensed and tested for alcohol. The precautionary measure against wasting alcohol is stated in the following clause: the liquor in tank F can be set boiling, and the distillate going off through pipe P into the alcoholic column L would indicate a higher percentage of alcohol, which condensed in M would show at the tail box M'. It is of course understood, that during this operation no liquor from the weak alcoholic tank E must be discharged through the pipe U on top of the column L. Such a course is far more satisfactory than to cool a sample from the tank F and test it directly, as I have found that while the tailings may show no test for alcohol on an alcoholometer, yet when submitted to distillation, they give a perceptible show of alcohol, probably 2% or more. In order that the tank F may contain only water and oils, the tail boxes should be watched so that nothing but water is discharged from the bottom of the column. This can be regulated very easily, by having the weak alcoholic vapor from E going through pipe U onto the top of the alcohol column L so regulated, that only water and oil come from the base of the column. Pipes Z, Z' and Z'', are steam pipes for boiling the contents or for creating pressure in the respective tanks F, D, C.

The boiling of the pyroligneous liquor in still A is continued until the lime in tank B is two-thirds neutralized more or less, when the feeding of weak alcohol through pump S into the column K is stopped and the distillate through condenser M is tested. When the distillation in still A has been arrested, after two-thirds has been distilled off, the supposition is that all alcohol is given off from B, and to be sure of this the weak alcoholic liquor which is pumped onto the top of the column by the pump S is stopped, because this shows alcohol. If this is stopped then if only vapor of water is given off from B the condensed vapor to condenser M through the tail box M' would show no alcohol test. If such a test shows that no alcohol is present, the valve W in pipe J is opened and the valve V closed and the boiling of the liquor in A continued, thus discharging only vapor of water through the pipe J into the outside air. This is continued until the lime in tank B shows that it is saturated, when acetate of lime is formed, the formula being as follows:—

$$Ca(OH)_2 + 2C_2O_2H_4 = Ca(O_2C_2H_3)_2 + 2H_2O,$$

at which time the operation is stopped and the contents of tank B are dropped into receiver C, when they give off 78° to 80° alcohol, in vapors, through pipe O. The tank B is then recharged with dry lime and liquor and the operation is continued. The now saturated acetate liquor is discharged from the receiver C through pipe X, by suitable pressure received from pipe 2, into settling tubs into which the said pipe discharges, or through a filter press to separate the insoluble lime compound from the liquor containing the soluble acetate of lime. By the above operations the liquor in tank B can be brought to a saturated solution with the steam necessary to evaporate the original pyroligneous liquor. If it were not for the fact that the insoluble matter must be separated to make a good gray acetate, the saturation and evaporation of the liquor in tank B might be brought to any desired degree, but on the other hand, if the liquor in tank B shows the lime to be saturated and the condensed liquor from condenser N shows alcoholic proof, then the boiling of the liquor in still A should be stopped and the liquor in tank B discharged into the receiver C, after the lime is all neutralized by the acetate acid. The condensed alcohol vapors in tank E are forced to the top of column L to save evaporation in tank E. This weak alcohol in being forced to the top of column L is separated out by the ascending currents of steam from the boiling of the contents of the tank F and the vapors from tank C. The condenser N discharges alcohol testing from 97% to start with down to about 78% to finish with, making the average test about 85% for about three quarters of the operation and the balance which runs from 78% to nothing is again run into the tank D to start the next operation. The condenser M yields a small amount of alcohol of an average test of 85% strength and a relatively large amount of weak alcohol which may run from 2% to 7% which is run into a suitable tank and then to storage tank F to start the next operation.

It is advantageous to so arrange the lime charges that the alcoholic test is off at condenser N before the lime is saturated in the tank B. In this way the excess of water in still A is discharged as vapor through the pipe J into the outer air and is not carried through the apparatus and condensed and so dilute the strength of the alcoholic distillate. It is desirable to have the pyroligneous liquor discharged into the top of the column Q before entering the still A. In this way a large percentage of the alcoholic strength is prevented from getting into still A, so that after the feeding of the liquor into the column Q is stopped the alcoholic strength in still A can be boiled out much sooner and can always be so regulated that the excess of water is in tank B, while the alcoholic strength is already out of it. The balance of the lime can then be saturated and the vapors from tank B conducted through pipe J into the outside air, as before.

With my process, before described, I am enabled to accomplish in one operation what has formerly required independent and distinct processes and also to effect a multiple use of the steam which, obviously is a matter of great economy. Also it is possible to obtain alcohol of any higher proof as desired.

I am aware that other forms of apparatus might be employed to carry out the process, and I do not, therefore, restrict myself to the use of the apparatus herein shown and described.

Having thus described my invention what I claim as new and desire to secure by Letters Patent, is:—

1. A process of manufacturing alcohol, consisting in converting crude pyroligneous liquor into vapors, extracting or eliminating the acid vapors resulting from such treatment and subjecting the resulting vapors of water and alcohol to the action of weak alcoholic solutions and thereby obtaining an alcoholic solution of any desired higher proof.

2. A process of manufacturing alcohol, consisting in boiling or evaporating crude pyroligneous liquor, passing the vapors produced by such treatment through a lime solution to absorb the acid vapors, and evaporating the alcohol from weak alcoholic solutions by bringing the same into the presence of the alcoholic and water vapors remaining at the elimination of the acid vapors by the lime solution and thereby obtaining an alcoholic solution of any desired higher proof without further use of the steam.

In testimony whereof I hereunto affix my signature in presence of two witnesses.

HERMAN B. SCHMIDT.

Witnesses:
    GRAFTON TYLER,
    FRED CLOSS.